United States Patent [19]
Burrough

[11] 3,881,305
[45] May 6, 1975

[54] CROP HANDLING IMPLEMENT HAVING A GUIDE SHIELD FOR CUT CROP MATERIAL

[75] Inventor: Donald E. Burrough, West Bend, Wis.

[73] Assignee: Gehl Company, West Bend, Wis.

[22] Filed: Dec. 19, 1973

[21] Appl. No.: 426,085

[52] U.S. Cl. .................................. 56/257; 56/119
[51] Int. Cl. ........................................... A01d 55/02
[58] Field of Search ........ 56/158, 189, DIG. 1, 192, 56/257, 296, 119

[56] References Cited
UNITED STATES PATENTS
1,567,013  12/1925  Rutishauser .................... 56/257 X
2,620,611  12/1952  Russell ........................... 56/192 X Primary Examiner—Louis G. Mancene
Assistant Examiner—J. N. Eskovitz
Attorney, Agent, or Firm—James E. Nilles

[57] ABSTRACT

A guide shield for a crop gathering implement and which is located directly behind a cutter bar or sickle assembly of the implement and which acts to prevent the cut crop material from accumulating or "balling up" against a rearward portion, such as a side wall of the implement. The guide shield acts to smoothly direct the cut crop into the implement for subsequent handling thereby.

11 Claims, 8 Drawing Figures

CROP HANDLING IMPLEMENT HAVING A GUIDE SHIELD FOR CUT CROP MATERIAL

BACKGROUND OF THE INVENTION

The invention pertain generally to agricultural implements of the type which travel over the ground and sever a crop therefrom and then move the crop rearwardly through the implement for subsequent handling. The invention is in the nature of an improvement over the U.S. Pat. 3,729,907 issued May 1, 1973 and entitled "Mower Conditioner" and which has been assigned to an assignee common with the present invention. Implements of this general type act to travel through the field and cut a swath in the crop, that portion of the crop over which the implement travels is thus severed from the ground while that portion of the crop located outwardly of the implement remains standing. A divider is used at the outer crop side wall of the implement so as to aid in picking up the crop and dividing it so that a portion of the crop inwardly of the divider is clearly cut by the implement while that portion outwardly of the divider is deflected away from the crop side wall of the implement. Heretofore considerable problems have been present with such implements in that the crop was not always clearly divided and/or cut at the crop side of the implement and plugged the cutting mechanism where it relates to the sidewall and consequently the crop material often balled up or wound up on the various parts of the implement adjacent the crop side wall thereof.

SUMMARY OF THE PRESENT INVENTION

The present invention provides a guide shield for a crop handling implement of the type having a sickle assembly that severs the crop from the ground and which implement then conveys the crop rearwardly through the machine. The guide shield provided by the present invention is located immediately behind the sickle assembly at the outer or crop side end thereof and acts to smoothly and clearly deflect the crop material past the outer side wall of the implement through which the sickle assembly must extend. As a result, the guide shield prevents the accumulating or balling up of the cut crop material against the side wall of the machine. The result is that the outer side of the machine cleanly divides and cuts the crop material as the machine progresses over the field and does not leave a streak of uncut material that is run down by the outer portion of the cutter bar.

These and other objects and advantages of the present invention will appear hereinafter as this disclosure progresses, reference be had to the accompanying drawings.

DESCRIPTION OF A PREFERRED EMBODIMENT

Figure 1:
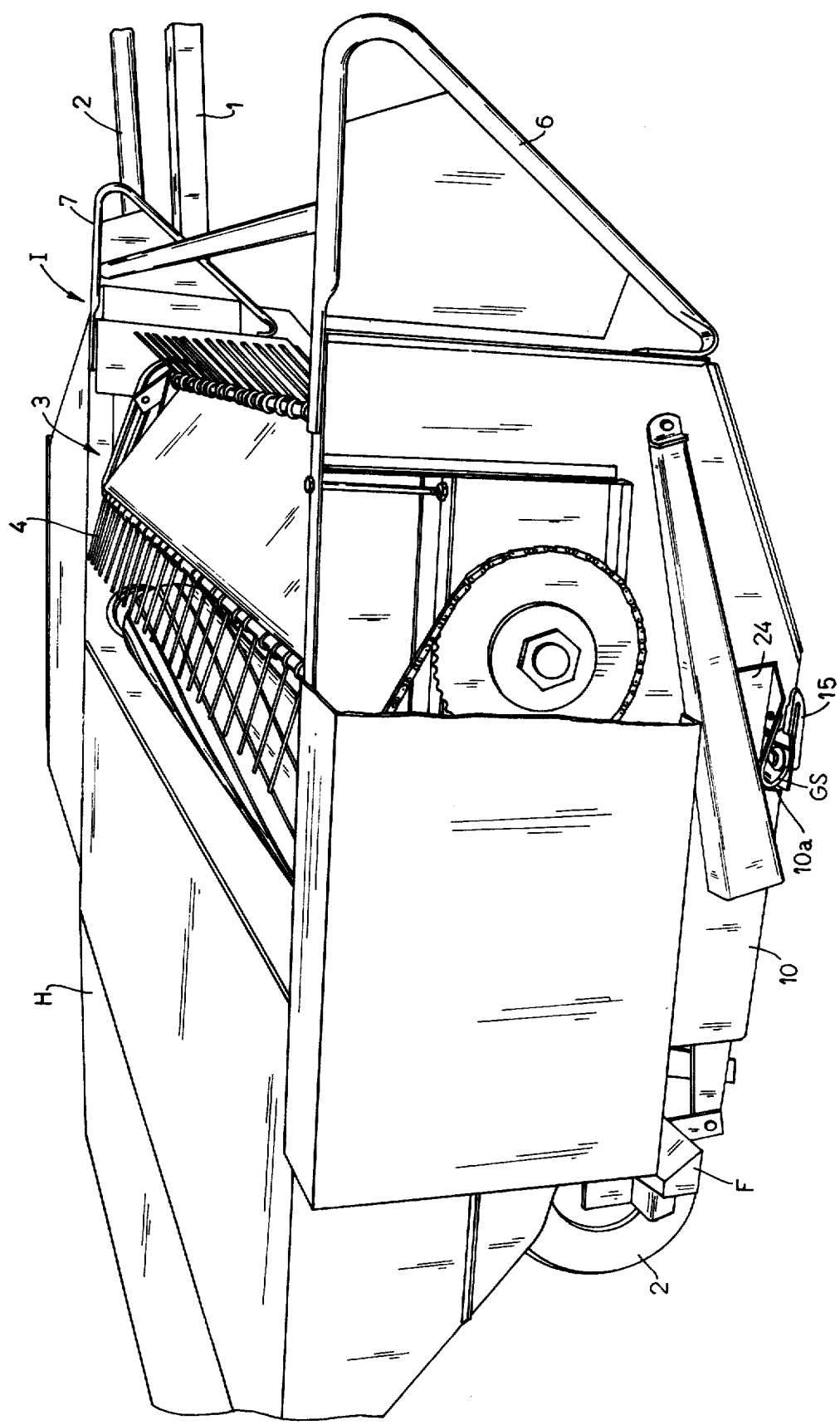
FIG. 1 is a fragmentary perspective view of a crop handling implement embodying the present invention, the view being taken generally from the crop or outer side of the implement.
Figure 3:
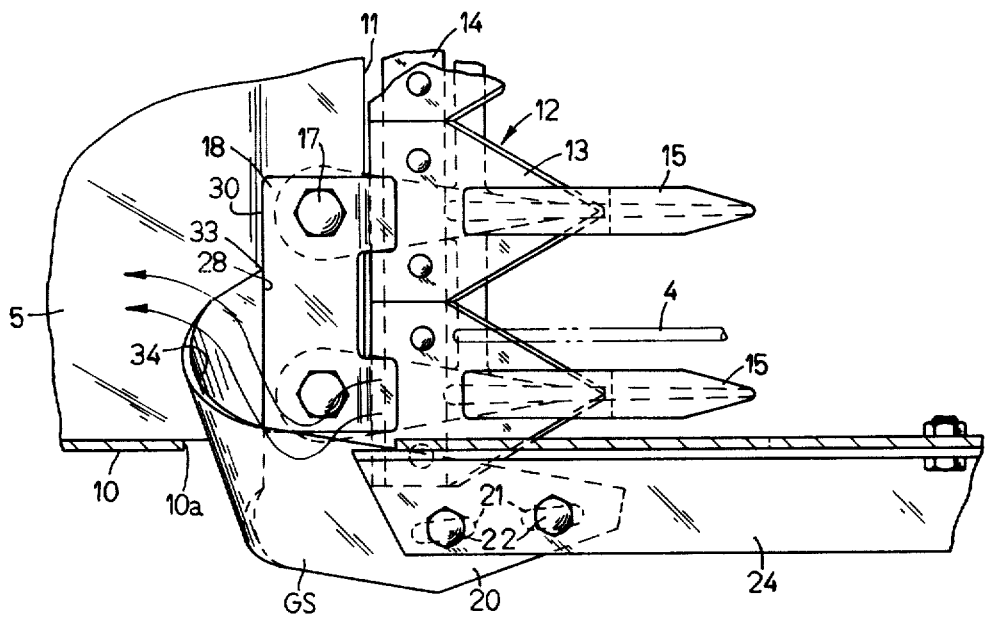
FIG. 3 is a plan view partially in section and with parts broken away of the portion shown in FIG. 2, and by means of curvilinear arrows also showing generally how the cut crop material passes over the guide shield.

The present invention has been shown and described in connection with an agricultural implement such as a mower conditioner which travels over the ground and cuts the forage crop such as hay and then deposits the cut crop back on the ground either in the same size swath from which it was cut or in a reduced swath. The invention may find utility in other types of crop handling means other than the one such such as in forage harvesters where the crop is cut from the ground and fed to a chopping cylinder or the like which is also carried by the implement. In any event, the mower conditioner shown may be of the type shown in the aforementioned U.S. Pat. No. 3,729,907 issued May 1, 1973 and entitled "Mower Conditioner" and which has been assigned to an assignee common with the present invention. Therefore, if a more complete description of the structure and operation of the various parts of the mower conditioner is deemed to be either necessary or desirable, reference may be had to such a patent. However, it is believed sufficient to say for purposes of this disclosure that the implement I may be drawn by a tractor or other power source, not shown, by means of the rearwardly extending draw bar 1 (FIG. 1). A power take off shaft 2 transmits power from the tractive vehicle to the implement to drive the crop engaging reel 3 in the conventional manner. The reel in turn has adjustable crop engaging tines 4 which sweep over the table 5 (FIG. 3) and push the cut crop rearwardly over the table. Ground wheels 2 (only one shown) support the implement at a generally constant height relative to the ground over which it traverses. The implement also includes crop dividers 6 and 7 at its front end, a frame F which is fabricated from steel members, a rear hood H and a side wall 10.

Secured along the forward, transverse edge 11 of the bottom of the table 5 is a reciprocable sickle assembly 12 including the individual sickle sections 13 which are riveted to a cutter bar 14 and guards 15 are spaced along the length of the sickle and are secured by bolt means 17 to the frame F. Conventional hold-down members 18 are also provided.

A sickle assembly including the guards are of conventional character and may be of the type shown in the U.S. Pat. No. 3,715,845 issued Feb. 13, 1973 and which has also been assigned to an assignee common with the present invention.

The outer side of an implement of this character, that is the side disposed away from the draw bar which is commonly referred to as the crop side of the machine, because it is located on that side of the field in which the crop is left standing as the machine passes over the field and cuts a swath through the crop. The divider 6 at the crop side of the machine enters the crop as the machine passes through it, thereby causing the crop to be divided, a portion of it being urged into engagement with the sickle assembly while that portion of the crop located outwardly of the machine is deflected away from the machine and left standing. Generally speaking, the vertical wall 10 of the machine which is located on the crop side of the machine and also the parts attached to that wall have been a source of trouble in prior machines as far as their tendency to cause the crop material to collect or clog at that side of the machine. This material then accumulates or "balls-up" to a point where it causes malfunction of the machine such as by feeding slugs to the machine or simply causing it to push the crop down without effectively handling the crop.

It is furthermore necessary for the sickle assembly to penetrate the wall 10 so as to be sure to cut the crop sufficiently to one side of the machine so as to form a clean line of cut through the field with adequate clearance for the machine to pass over the cut area. Accordingly, it will be noted particularly from FIGS. 1 and 3 that the sickle assembly 12 extends outwardly to a degree beyond the outermost limit of the wall 10. Such a construction has heretofore caused the material, that is the crop material that is cut adjacent the crop side of the machine, to collect or ball-up against the leading edge 10a of the wall, which edge defines part of the opening through which the sickle assembly extends. In other words, the crop material especially if it were of the long stringy type tended to wind around the leading edge 10a of the wall 10, thereby accumulating and balling up to an extent that caused malfunction of the machine and particularly the proper operation of both the sickle assembly and the crop gathering reel 3.

In accordance with the present invention, there has been provided a guiding shield GS and which is located directly behind the sickle assembly and directly ahead of the wall edge 10a so that the crop which is cut adjacent the end of the assembly is smoothly guided in a rearwardly and inwardly inclined path and over the top of the table 5, all without accumulating or winding against the wall 10. The arrangement of the guide shield is such that it extends from the outside of the wall 10, transversely across the wall and terminates inwardly over the table 5, and at the same time the guide shield is curved when viewed in elevation so that the material cut adjacent the end of the sickle assembly is smoothly swept over the surface of the guide shield by the generally rearward sweeping action of the harvester reel 3.

More specifically, the guide shield has an upper attached portion 20 having slotted openings 21 formed therethrough and through which the bolt means 22 extend and also extend through a bracket member 24 attached to the machine. The slots 21 extend in a generally fore and aft direction with respect to implement travel and thus the guide shield is adjustable so that its lower edge 28 bears firmly and tightly against the rear edge of the sickle assembly and more particularly against the rear edge of the hold-down member 18 of the sickle assembly. This accurate location between the rear of the sickle assembly and the lower edge of the guide shield prevents retardation or catching of the crop material as it passes thereover.

The shape of the guide shield is such that the lower innermost end 33 of the shield is located a considerable distance inwardly relative to the upper attaching portion 20 of the shield and the inner edge 34 of the shield extends from the upper portion 20 in a rearwardly and smoothly inwardly curving direction and then in an inwardly and generally forwardly curving direction. This particular shape acts to permit the crop material as it moves generally rearwardly relative to the implement to be moved inwardly of the wall 10 so as to clear the wall and then be gently and smoothly released once it has reached a position over the table 5.

Figure 2:
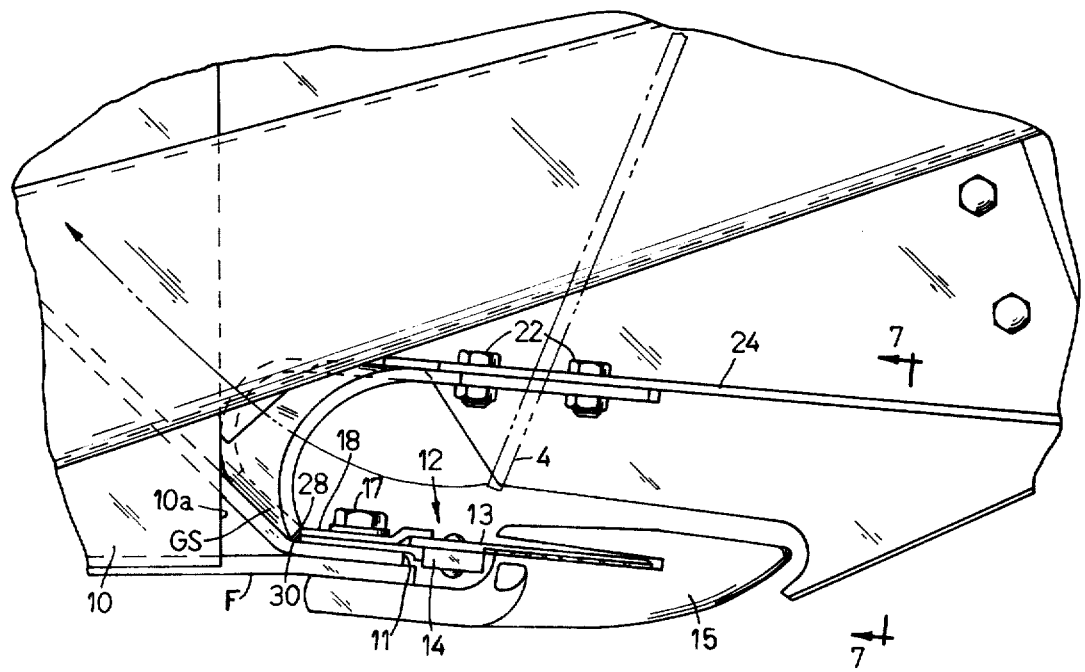
FIG. 2 is an enlarged elevational fragmentary view of a portion of the implement as shown in FIG. 1.
Figure 8:
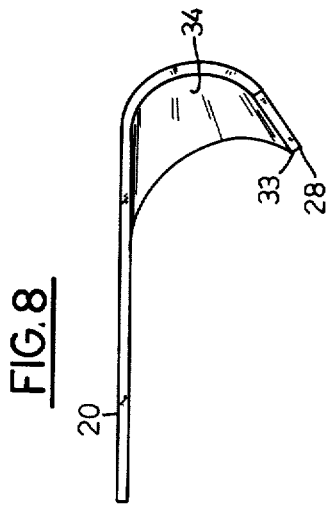
FIG. 8 is a view of the guide shield taken from the side opposite to that shown in FIG. 6.
Figure 4:
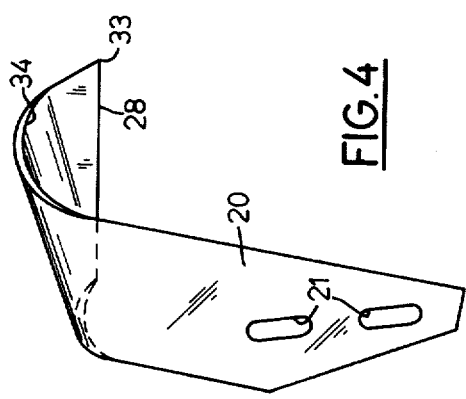
FIG. 4 is a view of the guide shield as shown in FIG. 3.
Figure 7:
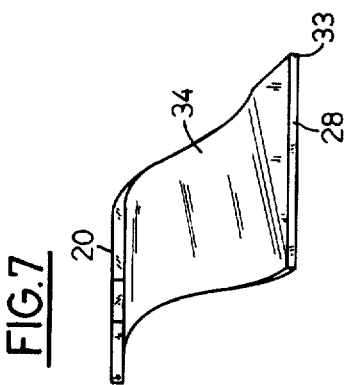
FIG. 7 is a front view of the shield as shown in FIG. 2, the view being taken generally along the line 7—7 in FIG. 2, or along the line 7—7 in FIG. 6.
Figure 5:
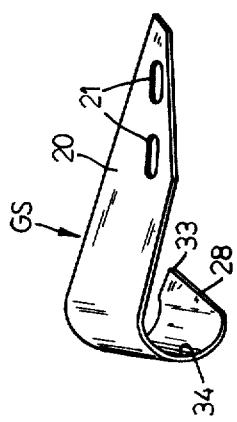
FIG. 5 is a perspective view of the guide shield but on a smaller scale.
Figure 6:
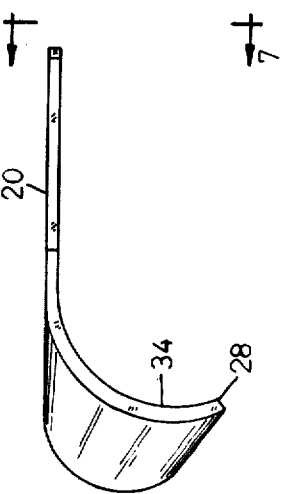
FIG. 6 is a view of the guide shield as shown in FIG. 2.

As viewed in FIG. 2, the shape of the guide shield is such that it extends from its upper attaching surface 20, curves rearwardly and generally downwardly to a point where it abuts against the rear side of the sickle assembly. This has the effect of causing the crop material to be turned downwardly, rearwardly inwardly as it travels transversely over the guide shield and consequently over the table 5.

The outer portion of the guide shield extends past the outer stroke of the sickle section. Therefore, no material may be pushed outwardly past the outer extremity of the shield thereby eliminating the possibility of catching on the outer edge.

Thus, the present invention provides a novel shaped guide shield which prevents accumulating and balling up of the cut crop material at the outer section of the sickle assembly and where the latter passes through a wall at the crop side of the implement.

I claim:

1. A crop treating implement for travelling over a crop and including a transverse sickle assembly for severing the crop and also having a generally vertical side wall means located at one side of the implement, said sickle assembly extending through an opening in said side wall means, said implement also having a frame for supporting said side wall and said sickle assembly, and a guide shield extending generally transversely through said opening and having an end portion secured to said frame, said guide shield having an intermediate portion extending rearwardly and inwardly from said opening and terminating in a lower edge that snugly abuts against a rear side of said sickle assembly whereby said guide shield acts to shield said generally vertical wall means and permits crop material to be smoothly directed past side wall means.

2. The implement set forth in claim 1 further including an adjustable connection between said guide shield and said implement frame whereby said guide shield can be adjusted generally in a fore and aft direction to insure that said guide shield lower edge abuts tightly against said rear side of said sickle assembly.

3. The implement set forth in claim 1 further characterized in that said guide shield intermediate portion when viewed in plan is inclined generally inwardly and rearwardly relative to said side wall means.

4. The implement set forth in claim 2 further characterized in that said guide shield intermediate portion when viewed in plan is inclined generally inwardly and rearwardly relative to said side wall means.

5. In a crop treating implement adapted to travel over a crop and having a transversely arranged crop cutting sickle assembly for severing the crop from the ground, said implement also having a generally vertical side wall means located at one side of the implement, said side wall means having an opening at its lower edge, said sickle assembly extending through said opening, said opening being defined at least in part by a generally vertically arranged edge of said side wall, said implement also having a frame for supporting said wall means and sickle assembly, and a guide shield extending generally transversely through said opening and being of generally U-shaped configuration when viewed in elevation, said guide shield having a generally forwardly extending upper portion secured to said frame, said guide shield then extending rearwardly and generally downwardly from said portion and terminating in a lower edge that snugly abuts against a rear side of said sickle assembly whereby said guide shield acts to shield said generally vertical edge of said wall and permit the crop material which has been cut by the outer end of said sickle assembly to be smoothly directed inwardly in a transverse direction and past said side wall means.

6. The implement set forth in claim 5 further including a bolt and slot connection between said guide shield and said impelement frame whereby said guide shield can be adjusted generally in a fore and aft direction to insure that said guide shield lower edge abuts tightly against a rear side of said sickle assembly.

7. The implement set forth in claim 5 further characterized in that said guide shield, when viewed in plan, has an intermediate portion which is inclined generally inwardly and rearwardly relative to said side wall means.

8. The implement set forth in claim 6 further characterized in that said guide shield, when viewed in plan, has an intermediate portion which is inclined generally inwardly and rearwardly relative to said side wall means.

9. A crop treating implement adapted to travel over a crop on the ground and having a crop receiving table including a transverse front edge, said implement also having a transversely arranged crop cutting sickle assembly secured along said table front edge and for severing the crop from the ground, said implement also having a generally vertical side wall means located at one side of said table, said implement also having a rotary crop gathering reel over said sickle assembly, said implement also having a frame for supporting said side wall and said sickle assembly, said sickle assembly extending through an opening in said side wall means, said opening being defined at least in part by a generally vertical edge of said side wall, and a guide shield extending generally transversely through said opening and being of generally U-shaped configuration when viewed in elevation, said guide shield having a generally forwardly extending upper portion secured to said frame, said guide shield also having a curved portion that extends rearwardly and generally downwardly from said upper portion and terminates in a lower edge that snugly abuts against a rear side of said sickle assembly whereby said guide shield acts to shield said generally vertical edge of said wall and permits the crop material which has been cut by said extending sickle assembly and conveyed by said reel to be smoothly directed inwardly in a transverse direction and past said side wall means and over said table.

10. The implement set forth in claim 9 further including a bolt and slot connection between said guide shield and said implement frame whereby said guide shield can be adjusted generally in a fore and aft direction to insure that said guide shield lower edge abuts tightly against a rear side of said sickle assembly.

11. The implement set forth in claim 9 further characterized in that said guide shield, when viewed in plan, has an intermediate portion which is inclined generally inwardly and rearwardly relative to said side wall means.

* * * * *